June 24, 1952 M. G. HOLLABAUGH 2,601,289

REITERATING SYSTEM

Filed April 26, 1946

INVENTOR.
MAX G. HOLLABAUGH

BY

ATTORNEY

Patented June 24, 1952

2,601,289

UNITED STATES PATENT OFFICE 2,601,289

REITERATING SYSTEM

Max G. Hollabaugh, Jackson Heights, N. Y., assignor, by mesne assignments, to International Standard Electric Corporation, New York, N. Y., a corporation of Delaware Application April 26, 1946, Serial No. 667,318

6 Claims. (Cl. 250—27)

This invention relates to electrical signal reiterating systems and more particularly to those adapted for the continuous circulation of pulse energy.

Many uses exist for pulse-reiterating systems in which one or more pulses are repeatedly circulated in a closed circuit. Such systems, for example, may be used for the storage of information in the form of pulse trains, or may be used for the generation of pulses, or as delay devices. One of the difficulties inherent in systems in which signals traverse the same circuit repeatedly, is that the signals are rapidly attenuated and distorted in waveform.

An object of the present invention is the provision of a pulse-reiterating system in which one or more pulses are circulated in a closed circuit.

Another object of the present invention is the provision of a pulse-reiterating system in which pulses, which are repeatedly circulated in a given circuit, are restored, during each circulation, to substantially a constant amplitude and shape.

Another object of the present invention is the provision of an improved pulse storage system.

A further object of the present invention is the provision of an improved pulse delay system.

A still further object of the present invention is the provision of a pulse generator in which one or more pulses are repeatedly circulated in a given circuit to produce a plurality of pulses. A feature of said generator is its ability to be synchronized with a synchronizing pulse.

Other and further objects of the present invention will become apparent and the invention will be best understood from the following description of embodiments thereof, reference being had to the drawings, in which.

Figure 2:
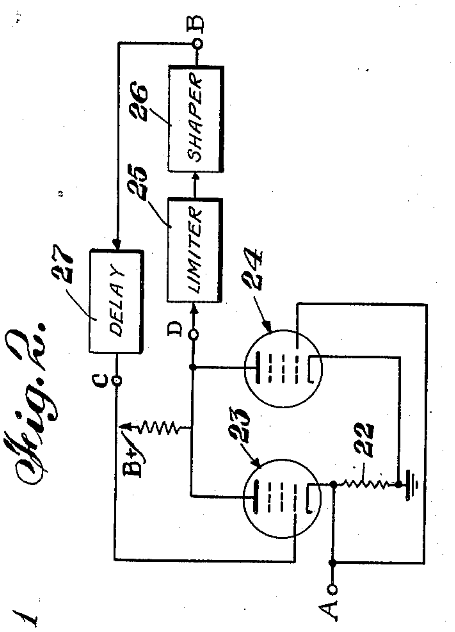
Fig. 2 is a schematic and block diagram of a pulse generator embodying my invention.

Referring now to the portion of a multi-channel system in connection with which my invention may be employed, the pulse-reiterating system 1 includes a closed circuit in which pulses may be circulated. A delay device 2 is arranged in a circuit so that an appreciable time elapses during which the pulse may make a complete trip around the circuit. In order to compensate for attenuation in the circuit and for distortion of the waveform, use may be made of an amplifier 3 to compensate for the attenuation as well as to serve as a point for the introduction of a pulse into the system. A limiter 4 serves, in conjunction with amplifier 3, to maintain the pulses at a constant amplitude and a shaper 5 is used to maintain the shape of the pulses. For example, if the pulses are rectangular, the rectangular wave shape is restored in shaper 5 each time a pulse passes therethrough. A pulse introduced to amplifier 3 as for example, along line 6 will thus travel through amplifier 3, limiter 4, shaper 5 and delay device 2 back to the amplifier 3. The pulse will continue to circulate around continuously. The value of the delay device selected depends on the purpose for which the system is to be used. If for example, a series of pulses are to be circulated in the pulse-reiterating system 1, the delay 2 is generally preferably longer than the maximum time required for the entire series so that the last pulse is applied to amplifier 3 along input line 6 before the first pulse is applied to amplifier 3 through delay 2. While the foregoing is a generally desirable and useful arrangement, there may be circumstances under which it is desirable to interleave the delayed pulse already circulating in the system, with new pulses being inserted therein along input line 6.

Figure 1:
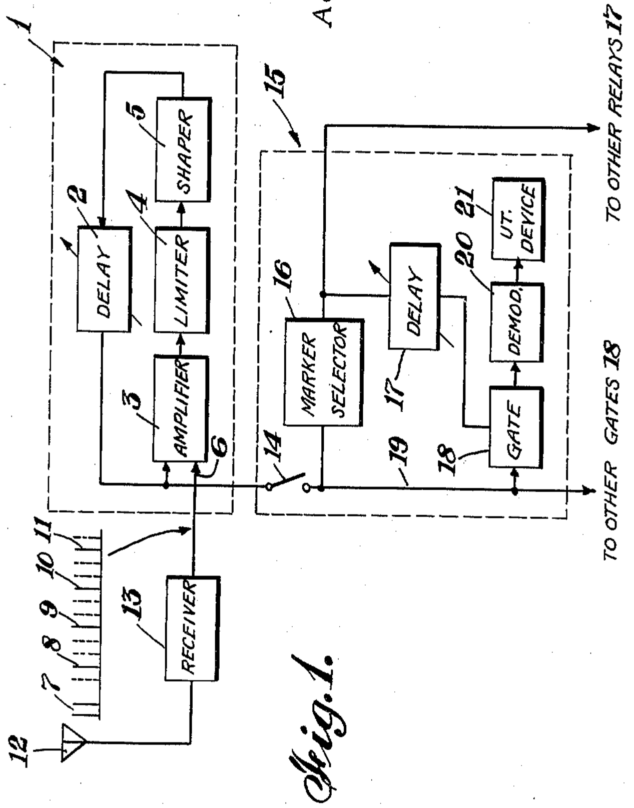
Fig. 1 is a block diagram of a pulse-reiterating system embodying my invention, as used as a storage or delay device in a multi-channel pulse-communication system.

In the system illustrated in Fig. 1, the pulse-reiterating system may be used as a delay or storage means for time-modulated pulses in a pulse multi-channel system of the type in which marker pulses 7 consisting of for example, two pulses relatively close to each other, are followed by a plurality of more widely spaced signal pulses 8, 9, 10, 11, etc., which signal pulses are varied in position with regard to the marker pulses according to their modulation. Each of the signal pulses 8–11 may be part of a separate channel in a multi-channel type system and the pattern of pulses 7–11 is repeated with, however, possible variations in the displacements of the signal pulses with respect to their marker according to their modulation.

The aforementioned train of pulses 7-11 may be used to modulate a carrier wave which may be radiated. The radiated energy may then be received on an antenna 12 and fed to a receiver 13 where the carrier wave is removed and the resultant output pulses, having the waveform illustrated in Fig. 1, may be transmitted via line 6 to the pulse-reiterating system 1. The delay device 2 preferably has such a value that all the pulses 7–11 may be fed sequentially into the amplifier 3 before the first of these pulses.

that is the marker pulses 7, is fed back to delay device 2 to the amplifier 3. An amplitude gate or threshold is provided at some point in the transmission loop to insure that undesired random disturbances will not be amplified and only the pulses will be repeated. This provision may be made, for example, by setting the bias of the amplifier 3 beyond cut-off. The wave train thus fed into the pulse-reiterating system will continue to circulate around said system. When it is desired to use any one or more signal pulses from the system for the purpose of translating the time modulation thereof into amplitude modulated signals, a switch 14 may be closed which connects the pulse-reiterating system 1 to a channel-selecting and translating system 15. The system 15 includes a marker selector 16 adapted to select the marker pulses 7 as for example, of the type described in the U. S. Patent No. 2,485,491, of October 25, 1949, issued to D. D. Grieg for "Multi-Channel System." The output of the marker selector is fed through a delay device 17 to open a gate 18 to whose input the pulse signals are transmitted via a line 19 from the pulse-reiterating system 1. Delay device 17 is adjusted so that the gate 18 is open for a short period of time during which the selected signal pulse is at the gate 18. Thus for example, the delay device 17 may be adjusted to pick out any desired one of the signal pulses 8, 9, 10, or 11. The output of the gate 18 may be fed through a demodulator 20 which translates the time modulation of the selected pulses into amplitude characteristics of electrical energy, which energy in turn is fed to a suitable utilization device 21 which may be for example, a current or voltage indicating device or an impulse counter.

While I have here described in system 15 an arrangement for selecting a single channel or single pulse from the wave train, it will be apparent that a plurality of such arrangements may be made and for this purpose the line 19 may be extended to other gate arrangements 18 and to other delay devices 17 having different delays to select different pulses and therefore different channels.

Figure 3:
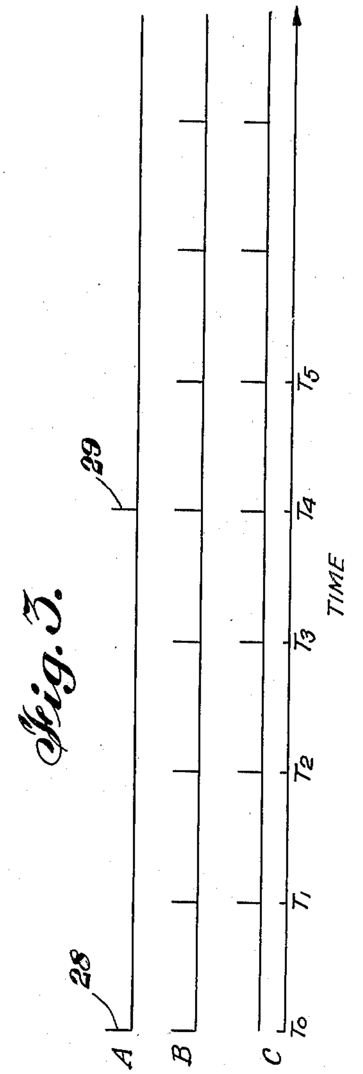
Fig. 3 is a set of curves used in describing the embodiment of Fig. 2.

Referring now to Fig. 2, the pulse generator or pulse repetition rate multiplier there shown is adapted to produce a plurality of relatively high rate pulses in response to a plurality of low rate pulses, with the low rate pulses being used to synchronize the high rate pulses. The low rate pulses illustrated in curve A, Fig. 3, are fed into the system at a point A, whence they are impressed across one of the inputs of an electron discharge device such as for example, across the cathode resistor 22 of a pentode 23 so as to periodically block conduction of the pentode 23 and are simultaneously impressed upon one of the inputs of a second electron discharge device, such as for example, the first grid of another pentode 24 to produce pulses at a point D in the anode circuit of pentode 24. The pulses at D are fed into a pulse-reiterating arrangement somewhat similar to that illustrated in Fig. 1. For example a pulse at point D goes through a limiter 25, a pulse shaper 26, and a delay device 27. After a given time delay determined by the value of delay device 27, the pulse is fed back to the first grid of pentode 23 and appears in its anode circuit at point D which is common to the anode circuits of pentodes 23 and 24. The pulse continues to circulate in the circuit including elements 25, 26, 27 and 23 until a new incoming pulse at point A momentarily blocks pentode 23.

This will stop the circulation of the pulse if it coincides in time with the pulse impressed upon the grid of pentode 23.

The operation of the system of Fig. 2 will be understood from the following explanation, reference being had to the curves of Fig. 3. Curve A represents the slowly repeated pulses that are applied to point A of the system of Fig. 2. One such pulse 28 (Fig. 3) is applied to point A at a time $T_0$. The pulse 28 is impressed upon the cathode of pentode 23 and in such a direction as to block the conduction of said pentode to the pulses applied to its first grid. The pulse 29 also is impressed upon the grid of tube 24 and therefore appears at points D and B at time $T_0$. This is represented in curve B. Pulse 28 at B has travelled without appreciable delay through limiter 25 and shaper 26, and passes through delay device 27 to appear after a delay at point C at the output of said delay device. At time $T_1$ pulse 28 has arrived at C. At substantially the same time, it also returns through pentode 23 (which is no longer blocked) to point B so that substantially at time $T_2$ pulse 28 is both at point C and at point B. Pulse 28 again passes through delay device 27 and at time $T_3$, appears at point C and at point B. At time $T_4$, the pulse 28 has again traversed the delay device 27 and appears at point B. But substantially simultaneously, a new incoming pulse 29 (curve A) is applied at point A and blocks pentode 23 so that at time $T_4$, no pulse derived from pulse 28 appears at point B. However, at this time pulse 29 is impressed on tube 24 and appears at B. This mode of operation continues. It will be seen that the generation of the repeated pulses is controlled by the low rate pulses applied to point A, with each low rate pulse starting the circulation of a new series of high rate pulses and stopping an old series of such pulses.

It will be apparent that by introducing additional delays in various portions of the system, such as for example, in the line connecting point A to the cathode, or the line connecting point A to the grid of pentode 24, numerous variations of the pulse patterns obtained, may be had. The general principles of my invention may be applied in many ways.

Accordingly, while I have described above the principles of my invention in connection with specific apparatus, and particular modifications thereof, it is to be clearly understood that this description is made only by way of example and not as a limitation on the scope of my invention.

I claim:

1. A pulse-reiterating system for circulating therein a given number of pulses comprising a pulse repeater responsive to an input pulse for repeating said pulse, means in said repeater for maintaining said repeated pulse at a substantially constant amplitude, a pulse shaper for maintaining the repeated pulse in a given shape, and a delay device having its input coupled to the output of the repeater and its output coupled to the input of said repeater, said delay device having a delay value longer than the maximum time occupied by said given number of pulses to be circulated.

2. A pulse-reiterating system according to claim 1 wherein said pulse repeater includes an amplitude limiter.

3. A pulse-reiterating system according to claim 1 wherein said pulse repeater includes an amplifier, a limiter coupled to the output of said amplifier and said pulse shaper is coupled to the output of said limiter.

4. A pulse-reiterating system comprising a pulse repeater responsive to an input pulse for producing an output pulse of substantially constant amplitude and shape, a delay device having its input coupled to the output of the repeater and its output coupled to the input of said repeater, means for impressing a series of pulses upon said repeater, and means for selecting a desired one of said pulses, comprising a normally-blocked circuit, and means for unblocking said circuit for a predetermined interval.

5. A pulse-reiterating system according to claim 4, wherein the impressed pulses include a marker pulse signal, means for selecting said marker signal and producing a control signal in response thereto, and a delay device through which the control pulses may be fed to said circuit to unblock said circuit at a time determined by the value of the delay introduced by said delay device.

6. A pulse repetition rate multiplier comprising, a pulse repeater responsive to an input pulse producing an output pulse of constant amplitude and shape, means for impressing on said repeater, input pulses having a relatively slow repetition rate, a delay device having its input coupled to the output of the repeater and its output coupled to the input of the repeater, said device introducing a delay less than the period elapsing between two successive input pulses, said impressing means includes means for injecting a pulse to circulate between the repeater and its delay device, and means for injecting an input pulse to block further circulation of a pulse between the repeater and its delay device.

MAX G. HOLLABAUGH.

REFERENCES CITED

The following references are of record in the file of this patent:

UNITED STATES PATENTS

| Number | Name | Date |
|---|---|---|
| 2,153,202 | Nichols | Apr. 4, 1939 |
| 2,212,173 | Wheeler | Aug. 20, 1940 |
| 2,415,359 | Loughlin | Feb. 4, 1947 |
| 2,415,874 | Goldstine | Feb. 18, 1947 |
| 2,429,227 | Herbst | Oct. 21, 1947 |
| 2,468,058 | Grieg | Apr. 26, 1949 |
| 2,471,408 | Busignies | May 31, 1949 |
| 2,482,974 | Gordon | Sept. 17, 1949 |

FOREIGN PATENTS

| Number | Country | Date |
|---|---|---|
| 528,192 | Great Britain | Oct. 24, 1940 |